(12) United States Patent
Rossi

(10) Patent No.: US 6,860,935 B2
(45) Date of Patent: Mar. 1, 2005

(54) MULTIPLE SCALE CEMENT COMPOSITE WITH POSITIVE AND DUCTILE SETTING IN UNIAXIAL TENSION

(75) Inventor: Pierre Rossi, Paris (FR)

(73) Assignee: Laboratoire Central des Ponts et Chausses, Paris (FR)

( * ) Notice: Subject to any disclaimer, the term of this patent is extended or adjusted under 35 U.S.C. 154(b) by 166 days.

(21) Appl. No.: 10/221,471

(22) PCT Filed: Mar. 9, 2001

(86) PCT No.: PCT/FR01/00707

§ 371 (c)(1),
(2), (4) Date: Sep. 12, 2002

(87) PCT Pub. No.: WO01/68548

PCT Pub. Date: Sep. 20, 2001

(65) Prior Publication Data

US 2003/0041781 A1 Mar. 6, 2003

(30) Foreign Application Priority Data

Mar. 14, 2000 (FR) .................................. 00 03228

(51) Int. Cl.[7] .............................................. C04B 14/48
(52) U.S. Cl. ........................ 106/644; 106/705; 106/713
(58) Field of Search ................................ 106/644, 705, 106/713

(56) References Cited

U.S. PATENT DOCUMENTS

| 4,513,040 | A | * | 4/1985 | Lankard | ..................... 428/49 |
|---|---|---|---|---|---|
| 4,780,141 | A | * | 10/1988 | Double et al. | ............. 106/38.3 |
| 4,804,585 | A | * | 2/1989 | Tani et al. | ................... 428/574 |
| 5,215,830 | A | * | 6/1993 | Cinti | ........................... 428/606 |
| 5,522,926 | A | | 6/1996 | Richard et al. | |
| 6,235,108 | B1 | * | 5/2001 | Lambrechts | ................ 106/644 |
| 6,478,867 | B1 | * | 11/2002 | Cheyrezy et al. | ........... 106/644 |

FOREIGN PATENT DOCUMENTS

| DE | 1 801 561 | | 5/1970 |
| EP | 0 934 915 A1 | | 8/1999 |
| FR | WO 95 01316 A | | 1/1995 |
| FR | XP-000964601 | | 7/1996 |
| FR | 2 771 406 A | | 11/1997 |

* cited by examiner

*Primary Examiner*—Paul Marcantoni
(74) *Attorney, Agent, or Firm*—James Ray & Associates

(57) ABSTRACT

The invention relates to a fiber/cement composite, the cementitious matrix of which has a water/binder ratio of less than 0.25 and consisting of cement, aggregate elements, fine pozzolanic elements and a plasticizer.

The reinforcement consists of three types of fiber: a) metal fibers having a length of between 15 and 25 mm and a diameter of between 0.25 and 0.3 mm, in a percentage by volume of between 0.5 and 3%; b) metal fibers having a length of between 5 and 10 mm and a diameter of between 0.15 and 0.2 mm, in a percentage of between 4 and 7%; and c) 1.5 to 5% of short metal fibers having a length of less than 3 mm.

The strength of this composite in uniaxial tension is greater than or equal to 30 MPa. It exhibits positive work-hardening and ductile behavior in uniaxial tension.

15 Claims, No Drawings

MULTIPLE SCALE CEMENT COMPOSITE WITH POSITIVE AND DUCTILE SETTING IN UNIAXIAL TENSION

The invention relates to the field of ultra high-performance fiber concretes, making it possible, in particular, to produce civil engineering structural elements for buildings and public works and having properties superior to those of elements of the prior art.

It relates more especially to a fiber/cement composite, the cementitious matrix of which has a compressive strength of greater than 150 MPa and a uniaxial tensile strength of greater than or equal to 6 MPa, this matrix having a water/binder ratio of less than or equal to 0.25 and consisting of a mix of cement, aggregate elements, fine pozzolanic elements, the particles of which have sizes of between 0.1 $\mu$m and 1 $\mu$m, and a plasticizer, this composite including a reinforcement consisting of metal fibers embedded in the cementitious matrix.

The term "cementitious matrix" denotes the cured cementitious composition excluding the metal fibers.

The addition of metal fibers to cementitious matrices improves the ductility of concretes. This technique has been developed over several years. Mention may be made among others, of:

concretes sold under the name CRC (Compact Reinforced Composites) which contain between 5 and 10% by volume of metal fibers having a length of 6 mm and a diameter of 0.15 mm;

concretes sold under the name RPC (Reactive Powder Concrete) which contain at most 2.5% by volume of metal fibers having a length of 13 mm and a diameter of 0.16 mm; and concretes called MCC (Multiscale Cementitious Composites) developed by the Applicant, which include blends of short and long metal fibers; the short metal fibers have a length of 5 mm and a diameter of 0.25 mm and the long metal fibers have a length of 25 mm and a diameter of 0.3 mm; the percentage of fibers incorporated into the matrix is 5% by volume of short fibers and 2% by volume of long fibers, i.e. a total of 7% by volume of fibers.

The choice of a high percentage of fibers (between 5 and 10%) in CRCs merely results in an increase in the tensile mechanical properties of the material as regards strength and ductility, but cannot have a significant impact on the load-bearing capacity and the ductility of a structure except in the case of very thin elements of the structure. Consequently, for thicker structural elements of the beam or slab type, CRC is used with a very high percentage of conventional reinforced concrete rebars. This is because the high percentage of short fibers increases the tensile strength of the material more than its ductility. It is therefore necessary, in order to construct a ductile structure from this type of concrete, to use a high percentage of rebars. However, a structure is weakened when a percentage rebar threshold is exceeded, on the one hand, because very high stress concentrations are then created at the surface of the structures, thus initiating many cracks, and on the other hand, because there is a negative group effect existing between the rebars which individually function much less well. Extensive cracking occurs around the rebars. The short fibers make it possible to control both the surface cracks and the cracks around the rebars. The combination of two reinforcements—rebars and short fibers, having two different scales—is therefore excellent. However, CRC, despite everything, as a few drawbacks. In particular, it provides a technical solution which is very expensive both in terms of material cost and labor cost.

The metal fibers used in RPCs are twice as long as those used in CRCs, while the diameter is the same. This choice leads to the use of fibers having a high specific surface area and has two consequences.

The first consequence is that, for the same workability of the material before setting, it is barely possible to introduce 2.5% by volume of fibers into RPCs whereas between 5 and 10% by volume of short fibers are introduced into CRCs. This relatively low percentage of fibers results in two negative aspects of the mechanical behavior of RPCs. Firstly, the fibers do not improve the strength of the matrix in uniaxial tension, which reaches about 8 MPa. In such a weak matrix, since the percentage of fibers is not high enough, a very substantial scatter in the post-cracking behavior of the material is then observed.

This shows that when introducing metal fibers of only a single size into an ultra-strong matrix, one cannot act effectively on the two scales, namely the scale of the material and the scale of the structure.

The second consequence is that the adhesion between the fibers and the matrix is much better in the case of RPCs and CRCs, although the matrices of RPCs and CRCs are similar. The fibers can then act on the more open cracks and this results in better behavior of the structure in terms of load-bearing capacity and ductility. With RPCs, it is possible to use lower amounts of conventional rebars than those used with CRCs in order to obtain ductile structures.

In MCCs, the fibers consist of a blend of short fibers and longer fibers, which makes it possible to act both on the scale of the material, by increasing the tensile strength, and on the scale of the structure in terms of the load-bearing capacity and the ductility. This being the case, it is possible without any problem, that is to say with good workability, to introduce a high total percentage of fibers, which may be up to more than 7% by volume. The behavior in uniaxial tension then exhibits positive work-hardening and may reach 15 MPa without any problem. Further information on the behavior of MCCs is available in "Bulletin des Laboratoires des Ponts et Chaussées [*Bulletin of the Bridges and Highways Laboratories*], 204, July-August 1998, REF. 4025, pp. 87–95.

FR-A-2 771 406 relates to a concrete comprising a cementitious material as compact as that of RPC and including wollastonite microfibers and metal fibers preferably having a length of 13 mm and a diameter of 0.16 mm. These wire-drawn cylindrical steel fibers therefore have a large specific surface area.

This geometrical characteristic of the metal fibers has two consequences:

these fibers adhere very strongly to the matrix, allowing them to act effectively on cracks having openings that range from 10 microns or so to 100 microns or so. They give the cementitious composite great ductility after the matrix has cracked which, without fibers, would be very weak;

they induce very substantial friction between them and the matrix in the fresh state, which leads to difficulties in applying the cementitious composite when the percentage of fibers by volume exceeds a limit, which may be set at 3%.

Wollastonite fibers are natural fibers of the acicular type, which have a length of 300 $\mu$m and a mean diameter of 20 $\mu$m, or fibers obtained by milling, the mean length of which is 8 $\mu$m. The percentage of natural fibers introduced into the matrix may be up to 35% by volume.

The geometrical characteristics and the percentage by volume of natural fibers introduced into the matrix, according to the teaching of FR-A-2 771 406, have an obvious mechanical consequence since these fibers act very effectively on the many microcracks in the cement paste, that is to say on the cracks having openings of less than one micron. This action results in an increase of about 25% in the tensile strength of the matrix.

Despite this action of the reinforcement on two scales in the matrix cracking process, the tensile strength of the concrete according to FR-A-2 771 406 remains modest and does not exceed 15 MPa. This is the consequence of a non-optimized choice of the dimensions of the fibers introduced into the matrix, as regards the matrix cracking process in tension.

This is because the cracking process may be split schematically into three steps.

During step 1, a large number of microcracks appear randomly throughout the volume of material subjected to tensile stress; these microcracks have openings which do not exceed one micron.

During step 2 of the cracking process, certain microcracks created during step 1 propagate, whilst others close up; these new cracks bridge openings not exceeding 10 μm.

Among the cracks propagating during step 2, a few continue their propagation during step 3 to form macrocracks which have openings of greater than 10 μm and which propagate in an unstable manner, leading to fracture of the concrete. These are then called "structural", the opening of which at the moment of fracture depends on the dimensions of the volume of concrete under tension and which therefore may reach several millimeters.

When the fibers introduced into the cementitious matrix act effectively with respect to the cracks created during cracking step 2, the composite exhibits a positive work-hardening behavior in uniaxial tension, that is to say that, after matrix cracking, the fibers are capable of picking up a tensile stress greater than that which caused the matrix to crack.

In the case of the concrete according to FR-A-2 771 406, the reinforcements chosen are able to act effectively only during phases 1 and 3 of the matrix cracking process in tension. The natural fibers act mainly and effectively during step 1 and the metal fibers during step 3. However, as regards the tensile strength, it is above all during step 2 that the reinforcements must act effectively since it is during this step 2 that the cracks liable to propagate in an unstable manner are created.

This action of stitching up the cracks created during step 2 of the cracking process could have been effectively accomplished by the metal fibers if they have been in larger number than the number of cracks created.

However, the choice of a fiber which has a small diameter, in order to act on the many cracks appearing during step 2, and a length sufficient to act on the macrocracks produced during step 3 means that it is possible to introduce only a restricted volume into the matrix because of their high specific surface area, hence insufficient effectiveness in respect of the cracks generated during step 2.

As mentioned in the introduction, the invention is to propose a fiber/cement composite which has a markedly improved tensile strength in uniaxial tension.

The object is achieved according to the invention by the fact that the reinforcement consists of at least three types of fiber:

a) long fibers made of wire-drawn steel, having a tensile strength of greater than 1500 MPa, a length of between 15 and 25 mm and a diameter of between 0.25 and 0.30 mm, in a percentage by volume of between 0.5 and 3%;

b) medium fibers made of wire-drawn steel, having a tensile strength of greater than 1500 MPa, a length of between 5 and 10 mm and a diameter of between 0.15 and 0.2 mm, in a percentage by volume of between 4 and 7%; and c) short fine metal fibers having a length of less than 3 mm, in a percentage by volume of between 1.5% and 5%.

According to a first embodiment variant, the short fibers are in the form of a mild steel wool obtained, by continuous planing of a wire and passage through a mill in order to obtain a powder composed of fine chips, the tensile strength of which is greater than 800 MPa.

According to a second embodiment variant, the short fibers are cylindrical steel fibers having a strength of greater than 2500 MPa, these fibers having a length substantially equal to 2 mm and a diameter substantially equal to 0.1 mm.

Thus, in the proposed composite, each type of fiber corresponds to one step of the cracking process.

The short fibers act on the cracks relating to cracking step 1. Since the number of cracks created during step 1 is very large, the number of short fibers must be large. The action of these short metal fibers has two consequences:

they retard the propagation of the step-1 cracks and therefore the creation of step-2 cracks, the propagation of which governs the tensile strength of the matrix. This being so, they allow the tensile strength of the cementitious composite to be increased, but to a lesser extent than the improvement obtained by the medium fibers;

they increase the mechanical homogeneity of the cementitious composite, by decreasing the dispersion in the tensile strength.

The medium fibers, which have a length of between 5 and 10 mm and a diameter of between 0.15 and 0.2 mm, are in very great number in the proposed cementitious composite because the percentage by volume is between 4 and 7%.

These fibers act effectively on the cracks generated during the cracking phase 2.

The long fibers of larger diameter are intended to act on the cracks created during cracking step 3.

The proposed fiber composite has a tensile strength of greater than or equal to 30 MPa and it imparts ductile behavior on the structures on which it is used.

Preferably, it is self-placing, that is to say it may be put into place without any vibration.

Introducing metal fibers of three different sizes into the matrix constitutes an optimized approach with regard to the three cracking steps in the composite in tension. However, it is possible to introduce a fourth and even a fifth fiber size, the dimensions of which in terms of length/diameter ratio are not optimal with respect to the cracks corresponding to cracking steps 2 and 3. However, it is possible to introduce these fibers, which individually are less effective for acting on two scales of cracks, at a total volume concentration greater than that which is possible when the three fiber sizes are used.

This choice has two consequences:

the individually lesser mechanical effectiveness of the fibers with respect to the tensile behavior may be compensated for by their greater number;

the greater number of fibers generally results in better mechanical homogeneity in tension, because of the lower dispersion as long as the matrix is not saturated with fibers. The latter aspect may be very important since, when designing structures made of ultra high-performance fiber concrete, a characteristic value of the tension in said concrete is taken into account, and not an average value.

To simplify the above, it may be put forward, that, to end up with a very strong cementitious composite which gives ductile behavior of the structures or structural elements in which it is used, it is essential, on the one hand, for a large number of fibers to act effectively on the cracks created during step 2 of the cracking process and, on the other hand, for fibers to act effectively on the cracks created during step 3.

In the case involving a thin structure made of fiber/cement composite having the same cementitious matrix as that described in the introduction, a fiber having dimensions suitable for cracking steps 2 and 3 may be chosen on condition that, at the moment of concrete fracture, the opening of the structural cracks relating to cracking step 3 is not several orders of magnitude greater than that relating to cracking step 2.

Moreover, in the case of a thin structure not breaking in bending, the crack opening corresponding to cracking step 3 depends directly on the thickness of this structure.

The invention also relates to a thin structure made of fiber/cement composite, the cementitious matrix of which has a compressive strength of greater than 150 MPa and a uniaxial tensile strength of greater than or equal to 6 MPa, this matrix having a water/binder ratio of less than or equal to 0.25 and consisting of a mix of cement, aggregate elements, fine pozzolanic elements, the particles of which have sizes of between 0.1 $\mu$m and 1 $\mu$m, and a plasticizer, this composite including a reinforcement consisting of metal fibers embedded in the cementitious matrix.

This thin structure is characterized in that the reinforcement consists of metal fibers of a single type, having a length of between 5 and 10 mm and a diameter of between 0.15 and 0.2 mm and in that the thickness of said structure is less than twice the length of the fiber in a percentage by volume of between 6 and 15%.

The fact of limiting the use of one-fiber cementitious composites to thin structures in which the smallest dimension does not exceed twice the length of the fiber also has a major consequence as regards the mechanical effectiveness of the fiber reinforcement. This is because the fibers are then preferentially oriented so as to be perpendicular to the smallest dimension of the structure and there is therefore optimized mechanical action with respect to the cracks which, themselves, propagate, owing to the way these structures function, preferentially perpendicular to this small dimension.

The cement used is advantageously a Portland cement, such as CPA PMES, HP, HPR, CEM 1 PMES, 52.5 or 52.5R or HTS (high silica content) Portland cements.

The aggregate elements present in the cementitious matrix are particles whose maximum size is preferably less than 0.4 times the length of the smallest fiber constituting the reinforcement.

The fine pozzolanic elements are chosen from silica compounds, especially fumed silica, fly ash, blast furnace slag, and clay derivatives such as kaolin. The silica may be a fumed silica coming from the zirconium industry, preferably a fumed silica coming from the silicon industry.

The plasticizer may be chosen from lignosulfonates, casein, polynaphthalenes, particularly alkali metal polynaphthalenesulfonates, formaldehyde derivatives, alkaline metal polyacrylates, alkali metal poly-carboxylates and grafted polyethylene oxides.

Other admixtures may be added to the composition of the matrix.

Presented below are three examples of ultra high-performance fiber concrete (UHPFC), the design of which is based on the foregoing.

The respective composition of these three UHPFCs is given below. (Compositions in kg/m$^3$)

| Constituents | UHPFC 1 | UHPFC 2 | UHPFC 3 |
|---|---|---|---|
| CPA-CEM 1 52.5 HTS Cement | 1013 | 1013 | 1013 |
| Anglefort fumed silica | 313 | 313 | 313 |
| Fontainebleau sand | 493 | 601 | 466 |
| Water | 207 | 207 | 207 |
| THP Chryso-Superplast superplasticizer (solids content) | 19.5 | 19.5 | 19.5 |
| Fiber 1 | 780 | | 468 |
| Fiber 2 | | 468 | |
| Fiber 3 | | | 156 |
| Fiber 4 | | | 234 |

Fibers 1, 2 and 3 are wire-drawn steel fibers having a tensile strength of greater than 1500 MPa. The respective dimensions of each fiber are the following:

Fiber 1: length: 5 mm; diameter: 0.15 mm;

Fiber 2: length: 10 mm; diameter: 0.2 mm;

Fiber 3: length: 25 mm; diameter: 0.3 mm, provided with hooks at these ends.

Fiber 4 is mild steel wool having a tensile strength of greater than 800 MPa. It is obtained by continuously planing a wire. It is then passed through mills to obtain a powder composed of fine chips, the maximum length of which does not exceed 2 to 3 mm.

Comment: in UHPFC 3, fiber 4 is chosen to act on cracking step 1, fiber 1 on cracking step 2 and fiber 3 on cracking step 3.

The three UHPFCs given above are heat-treated: 72 h after their manufacture, they are oven-treated at 90° C. at atmospheric pressure for 48 h.

The three UHPFCs have a Young's modulus of greater than 45 GPa and a compressive strength of greater than 150 MPa.

Their bending tensile strengths, indicated below, were obtained from 3-point bending tests on prismatic test specimens of dimensions 4×4×16 cm.

The respective mean bending tensile value of the three UHPFCs are the following:

UHPFC 1: >40 MPa

UHPFC 2: >45 MPa

UHPFC 3: >70 MPa.

For UHPFC 2, a 4-point bending test on plates 40 cm in length, 10 cm in width and 2 cm in thickness (i.e. twice the length of the fiber of the UHPFC 2) were also carried out.

The mean bending tensile value obtained from these tests is greater than 75 MPa (instead of 45 MPa for a test specimen measuring 4 cm in thickness, therefore 4 times the length of the fiber).

It may therefore be seen that these results confirm that, in the case of a one-fiber UHPFC, it is essential to use it in thin structures whose thickness does not exceed twice the length of the fiber.

What is claimed is:

1. A fiber/cement composite, the cementitious matrix of which has a compressive strength of greater than 150 MPa and a uniaxial tensile strength of greater than or equal to 6 MPa, this matrix having a water/binder ratio of less than or equal to 0.25 and consisting of a mix of cement, aggregates, fine pozzolans, the particles of which have sizes of between 0.1 μm and 1 μm, and a plasticizer, this composite including a reinforcement comprising metal fibers embedded in the cementitious matrix, wherein the reinforcement comprises at least three types of fiber:

a) long fibers made of wire-drawn steel, having a tensile strength of greater than 1500 MPa, a length of between 15 and 25 mm and a diameter of between 0.25 and 0.30 mm, in a percentage by volume of between 0.5 and 3%;

b) medium fibers made of wire-drawn steel, having a tensile strength of greater than 1500 MPa, a length of between 5 and 10 mm and a diameter of between 0.15 and 0.2 mm, in a percentage by volume of between 4 and 7%; and c) short fine metal fibers having a length of less than 3 mm, in a percentage by volume of between 1.5% and 5%.

2. The composite as claimed in claim 1, wherein the short fibers are in the form of a mild steel wool obtained, by continuous planing of a wire and passage through a mill in order to obtain a powder composed of fine chips, the tensile strength of which is greater than 800 MPa.

3. The composite as claimed in claim 1, wherein the short fibers are cylindrical steel fibers having a strength of greater than 2500 MPa, the fibers having a length substantially equal to 2 mm and a diameter substantially equal to 0.1 mm.

4. The composite as claimed in claim 1, wherein it has a uniaxial tensile strength of greater than or equal to 30 MPa.

5. The composite as claimed in claim 1, wherein it is self-placing.

6. The composite as claimed in claim 1, wherein it has undergone a heat treatment at a temperature of approximately 90° C.

7. The composite as claimed in claim 2, wherein it has a uniaxial tensile strength of greater than or equal to 30 MPa.

8. The composite as claimed in claim 3, wherein it has a uniaxial tensile strength of greater than or equal to 30 MPa.

9. The composite as claimed in claim 2, wherein it is self-placing.

10. The composite as claimed in claim 3, wherein it is self-placing.

11. The composite as claimed in claim 4, wherein it is self-placing.

12. The composite as claimed in claim 2, wherein it has undergone a heat treatment at a temperature of approximately 90° C.

13. The composite as claimed in claim 3, wherein it has undergone a heat treatment at a temperature of approximately 90° C.

14. The composite as claimed in claim 4, wherein it has undergone a heat treatment at a temperature of approximately 90° C.

15. The composite as claimed in claim 5, wherein it has undergone a heat treatment at a temperature of approximately 90° C.

* * * * *